(12) United States Patent
McKay

(10) Patent No.: US 9,315,177 B2
(45) Date of Patent: Apr. 19, 2016

(54) ANTILOCK BRAKING SYSTEM WITH DIRECTIONAL CONTROL

(75) Inventor: Gary E. McKay, Wichita, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 13/419,493

(22) Filed: Mar. 14, 2012

(65) Prior Publication Data

US 2013/0245907 A1    Sep. 19, 2013

(51) Int. Cl.
*B60T 8/17* (2006.01)
*B64C 25/46* (2006.01)
*B64C 25/48* (2006.01)

(52) U.S. Cl.
CPC .............. *B60T 8/1703* (2013.01); *B64C 25/46* (2013.01); *B64C 25/48* (2013.01)

(58) Field of Classification Search
CPC ............ B60T 2260/024; B60T 8/1703; B60T 8/1755–8/17554; B64C 25/46–25/48
USPC ....................................................... 701/3, 71
See application file for complete search history.

(56) References Cited

U.S. PATENT DOCUMENTS

| | | | |
|---|---|---|---|
| 3,880,475 A * | 4/1975 | Booher ......................... 303/195 |
| 4,367,529 A * | 1/1983 | Masclet et al. ................. 701/79 |
| 4,482,961 A * | 11/1984 | Kilner et al. .................... 701/16 |
| 5,513,821 A * | 5/1996 | Ralph ............................ 244/50 |
| 6,581,649 B2 * | 6/2003 | Jursich ............................. 141/5 |
| 8,403,429 B2 * | 3/2013 | Hurst et al. ................... 303/126 |
| 2004/0220714 A1* | 11/2004 | Rudd, III ........................ 701/71 |
| 2005/0200198 A1* | 9/2005 | Rudd ............................. 303/167 |
| 2007/0282491 A1* | 12/2007 | Cox et al. .......................... 701/3 |
| 2008/0001471 A1* | 1/2008 | Rudd ................................ 303/3 |
| 2010/0006699 A1* | 1/2010 | Sullivan ....................... 244/111 |
| 2010/0102173 A1* | 4/2010 | Everett et al. ................ 244/175 |
| 2010/0276988 A1* | 11/2010 | Cahill ............................ 303/20 |
| 2012/0330482 A1* | 12/2012 | Benmoussa ....................... 701/3 |

* cited by examiner

*Primary Examiner* — Calvin Cheung
*Assistant Examiner* — Courtney Heinle
(74) *Attorney, Agent, or Firm* — Lathrop & Gage LLP

(57) ABSTRACT

A system and method for adjusting a yaw of an aircraft having an antilock braking system is disclosed. The antilock braking system includes a controller configured to receive a directional input from a rudder. The controller is further configured to deliver a braking output to at least one of a left wheel brake and a right wheel brake. A position of the rudder indicates a pilot's desired steering response, and to allow for braking optimization by the antilock braking system, the pilot depresses fully the left wheel brake pedal and the right wheel brake pedal. The controller receives the directional input after both the right wheel brake pedal and the left wheel brake pedal have been fully depressed. The controller then delivers the braking output and a pressure on one of the left wheel brake and the right wheel brake is reduced in accordance with the directional input.

14 Claims, 6 Drawing Sheets

ANTILOCK BRAKING SYSTEM WITH DIRECTIONAL CONTROL

BACKGROUND OF THE INVENTION

1. Field of the Invention

The invention relates generally to the field of antilock braking systems. More specifically, the invention relates to the field of antilock braking systems for use with aircraft.

2. Description of the Related Art

Antilock braking systems have been employed for the past several decades to enhance braking efficiency of aircraft. Initially, such antilock braking systems included elaborate and expensive hydraulic controls that cycled the brakes on and off rapidly, and permitted the aircraft to be stopped with greater efficiency by preventing the wheels of the aircraft from slipping excessively or locking up. Electronic controls were later implemented and allowed for antilock action that is more responsive to actual ground conditions.

U.S. Pat. No. 3,880,475 to Booher discloses an antilock braking system consisting of a wheel speed transducer for each of the right and left wheels of the aircraft, a deceleration detection circuit, and a skid detector circuit. The speed transducers generate signals that are proportional in frequency to the wheel rotational velocity. A modulator circuit receives the outputs of the deceleration detector and skid detector circuits, and causes a control valve to regulate brake pressure in accordance with these signals. A logic circuit responsive to a locked wheel condition or a bounced landing is also included, and may temporarily override the normal control of the brakes.

U.S. Pat. No. 6,851,649 to Radford discloses an antilock braking system for use with aircraft and other vehicles. A speed sensor is associated with each wheel of the aircraft, and as the brake is applied to a wheel, the speed sensor measures the wheel speed and transmits this information to a processor. The processor then monitors the deceleration of the wheel, and compares this deceleration to a maximum allowable deceleration, which is a threshold above which the wheel would lock up and skid. If the deceleration of the wheel exceeds the maximum allowable deceleration, the processor transmits a signal to the brake causing the brake to release momentarily. Release of the wheel allows the wheel to momentarily rotate freely, thereby preventing wheel skids. The processor may also be configured to perform other routines, such as hydroplane protection operations.

SUMMARY

Systems and method for adjusting a yaw of an aircraft having an antilock braking system are disclosed. According to one embodiment, the antilock braking system includes a controller configured to receive a directional input from a rudder. The controller is further configured to deliver a braking output to at least one of a left wheel brake and a right wheel brake. A position of the rudder indicates a pilot's desired steering response, and to allow for braking optimization by the antilock braking system, the pilot depresses fully the left wheel brake pedal and the right wheel brake pedal. The controller receives the directional input from the rudder after both the right wheel brake pedal and the left wheel brake pedal have been fully depressed. The controller then delivers the braking output and a pressure on one of the left wheel brake and the right wheel brake is reduced in accordance with the directional input.

According to another embodiment, a method for slowing an aircraft travelling on a runway comprises the step of receiving a full-on signal from a left hand wheel brake and a right hand wheel brake. A directional input is then received, and a pulsing cycle is imposed wherein an intermittent and automatic release of both of the left and right hand wheel brakes occurs. The pressure on one of the left hand wheel brake and the right hand wheel brake is reduced according to the directional input.

According to yet another embodiment, a system configured to eliminate a need for manual differential braking to steer on a runway an aircraft having a free-castering nosewheel is disclosed. The aircraft has a rudder, a right wheel, a left wheel, a right wheel brake, a left wheel brake, a right brake pedal for braking of the right wheel, and a left brake pedal for braking of the left wheel. A left wheel speed sensor is coupled to the left wheel and is adapted to determine a speed of the left wheel. A right wheel speed sensor is coupled to the right wheel and is adapted to determine a speed of the right wheel. The system comprises at least one computer memory configured for storing data, and a processor that is in data communication with the at least one computer memory. The processor is adapted to obtain a directional input from the rudder, a speed of the left wheel from the left wheel speed sensor, and a speed of the right wheel from the right wheel speed sensor. The processor is configured to provide a braking output to at least one of the left wheel brake and the right wheel brake. The processor obtains the directional input once both the right brake pedal and the left brake pedal have been fully depressed. The processor then reduces a slip of one of the left wheel and the right wheel according to the directional input. The braking output is proportional to the directional input.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for an antilock braking system that enables a pilot to maintain directional control of an aircraft travelling on the ground (e.g., a runway or other such surface) without manual differential braking. In this document, references are made to directions such as left, right, front, back, and the like. These references are exemplary only and are used to describe the disclosed apparatus in a typical orientation or operation, but are not independently limiting.

Controlling the direction of an aircraft during braking can be challenging, particularly where strong crosswinds are present. On aircraft having a nosewheel steering, directional control on the ground is primarily accomplished using rudder control at higher aircraft speeds (where aerodynamic forces are significant), and via the nosewheel steering at lower speeds. Differential braking and/or differential thrust may also be used as secondary directional control mechanisms on aircraft having nosewheel steerings. On aircraft having a free-castering nosewheel, however, differential braking (along with rudder control) is required for directional control. The current invention, though not so limited, is particularly useful for maintaining directional control of aircraft having a free-castering nosewheel.

Figure 1:
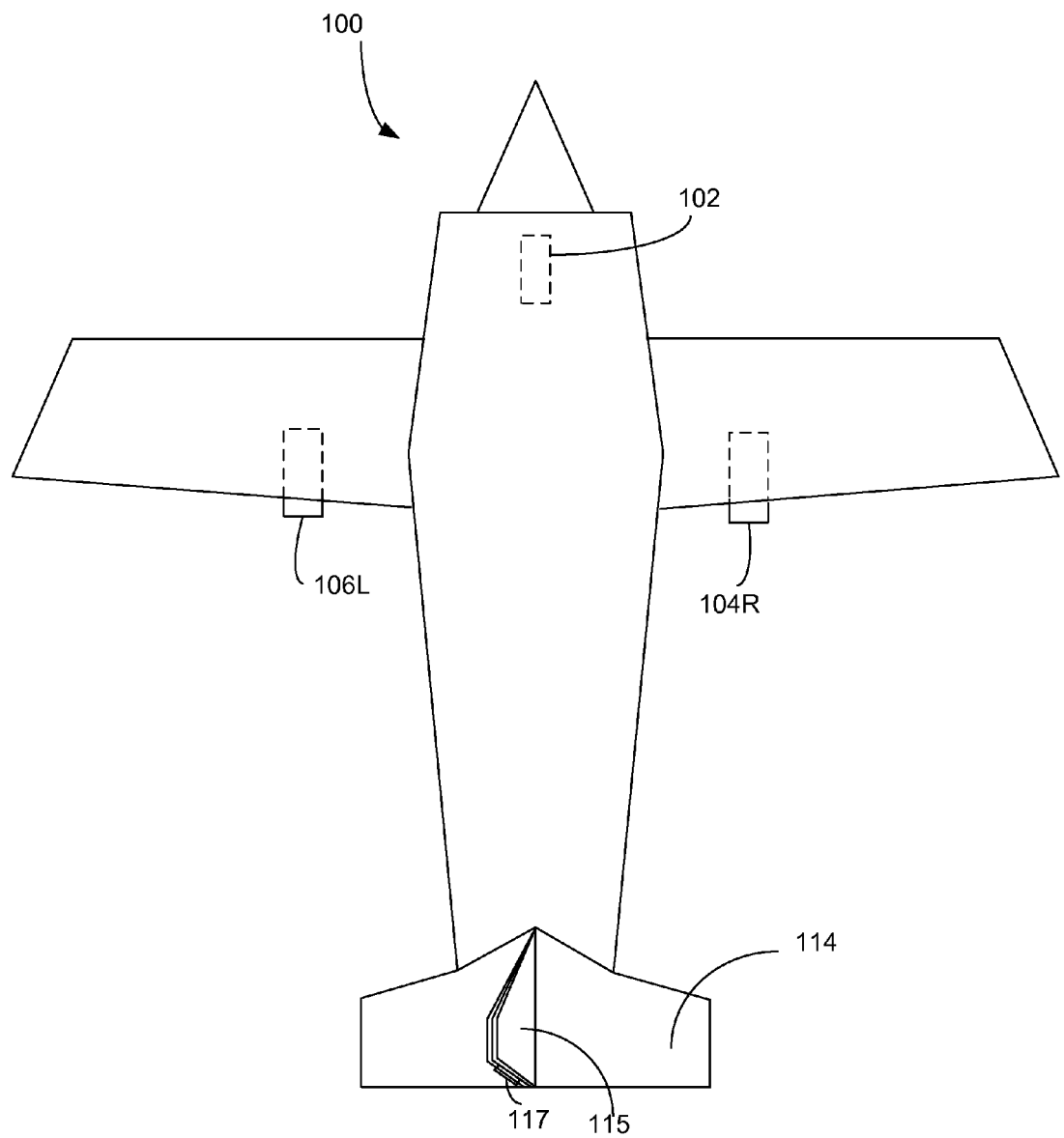
FIG. 1 is a top view of an aircraft having a free-castering nosewheel.

FIG. 1 shows an aircraft 100 with a free-castering nosewheel 102. When viewed from the top, facing the back of the aircraft 100, it can be seen that the aircraft 100 has a right wheel 104R and a left wheel 106L. Although not clearly visible in the figures, a right brake pedal 108R is used to control a right brake 108B that is linked to the right wheel 104R, and a left brake pedal 110L is used to control a left brake 110B that is linked to the left wheel 106L. The aircraft 100 also has a tail 114, atop which a vertical fin 115 having a rudder 117 is disposed. The aircraft 100 is not equipped with an antilock braking system.

Figure 2:
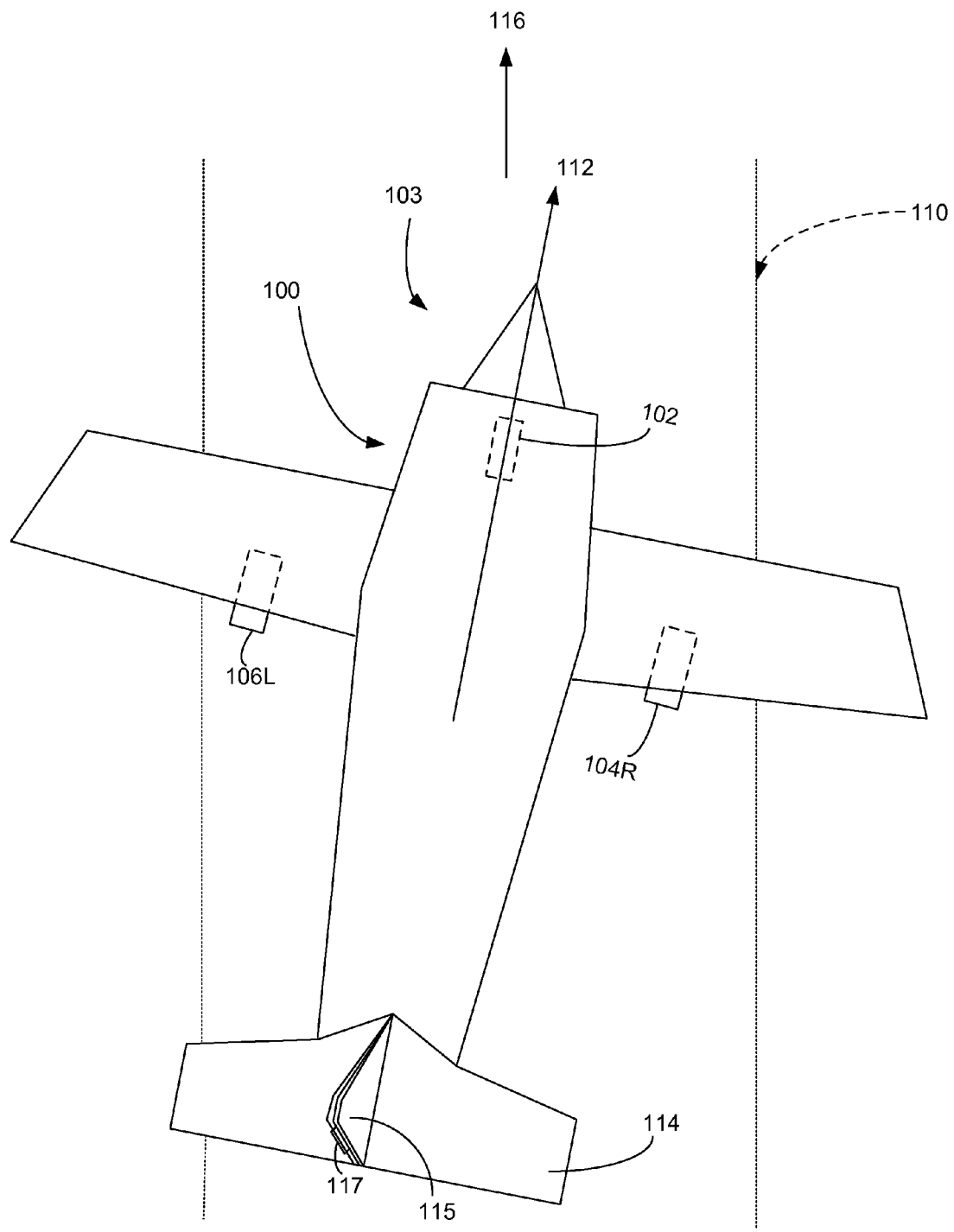
FIG. 2 shows a top view of the aircraft of FIG. 1 taxiing on a runway and having an unintended direction of travel.
Figure 3:
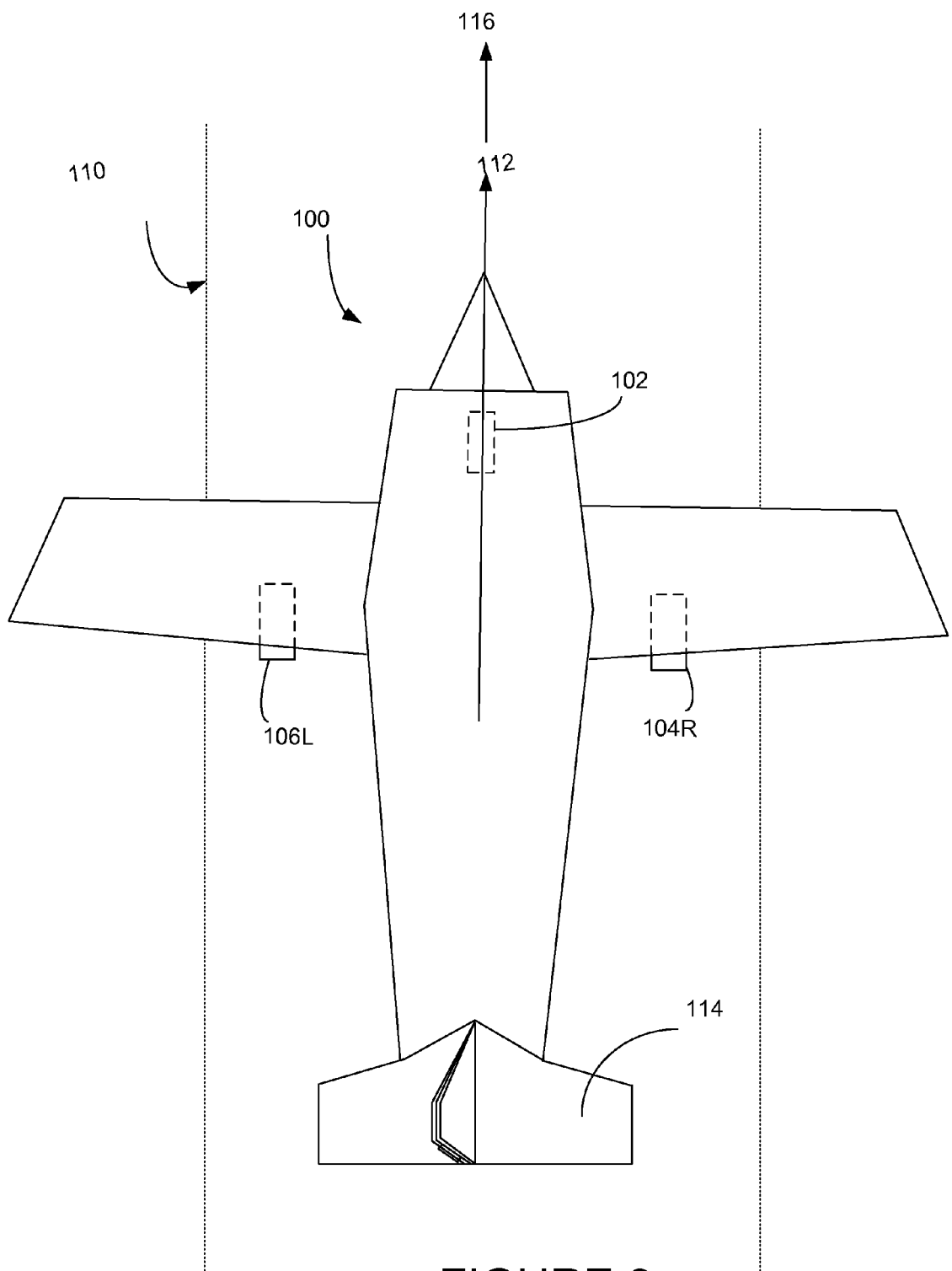
FIG. 3 shows a top view of the aircraft of FIG. 2 after its direction of travel has been adjusted.

FIGS. 2-3 illustrate directional control of the aircraft 100 via differential braking. Specifically, FIG. 2 shows the aircraft 100 taxiing on a runway 110 (for e.g., during landing) and traveling in a direction 112. When facing the tail 114 of the aircraft 100, it can be seen that a nose 103 of the aircraft 100 in FIG. 2 has an undesired right hand yaw, and needs to be steered to the left so that the aircraft 100 travels in an intended direction 116 along the center of the runway 110. A corrective left hand yaw may be introduced via differential braking to ensure that the direction of travel 112 of the aircraft 100 corresponds to the intended direction of travel 116. To achieve this objective, the pilot may depress the left brake pedal 110L with a greater force than the right brake pedal 108R, causing the left wheel 106L to rotate at a slower rate than the right wheel 104R. Because the right wheel 104R will generally travel a greater distance than the left wheel 106L as a result, the aircraft will desirably yaw to the left. Once the direction of travel of the aircraft 100 tracks the intended direction of travel 116 (see FIG. 3), both the left brake pedal 110L and the right brake pedal 108R can be depressed with equal force.

If the aircraft 100 had been equipped with an antilock braking system, the pilot may not have been able to steer the aircraft 100 via differential braking in this way. As known to those skilled in the art, antilock braking systems are feedback control systems that modulate brake pressure in response to a measured wheel's (e.g., the right wheel 104R or the left wheel 106L) deceleration, and prevent the wheel from locking up during braking. It is also known that the braking system of an aircraft 100 is most effective (i.e., produces the optimum retarding force) when the speed of the right wheel 104R and the left wheel 106L is approximately 85% of the ground speed of the aircraft 100. This difference (100%−85%=15%) between the speed of the aircraft 100 and the speed of a particular wheel is known as the percent slip of that wheel. In the absence of an antilock braking system, if the brakes are applied fully, the wheels may lock up (i.e., a 100% slip), thereby reducing both braking effectiveness and steering ability. An antilock braking system prevents the wheels from locking up and generally maintains the 15% target slip for each of the left (106L) and right (104R) wheels by pulsing the brakes 108R, 110L, at different frequencies if required, sometimes as quickly as twenty to thirty times a second.

To compute the slip of a wheel (e.g., the right wheel 104R) for maintenance of the slip target, the antilock braking system's controller compares the speed of that wheel (104R) to the ground speed of the aircraft 100. Typically, the speed of the wheels (e.g., the right wheel 104R or the left wheel 106L) may be measured directly by speed sensors that are coupled to the wheels. The ground speed of the aircraft 100, on the other hand, may be difficult to measure directly, and may be estimated using proprietary algorithms.

Effectuating differential braking by depressing one brake pedal (e.g., the left brake pedal 110L) with a greater force than the opposite brake pedal (e.g., the right brake pedal 108R to cause the aircraft to yaw to the left) is both simple and intuitive for pilots. As noted however, where the aircraft 100 is equipped with an antilock braking system, differential braking is not commonly employed for directional control. This is because, pilots maneuvering aircraft having antilock braking systems are trained to depress the right (108R) and left (110L) brake pedals fully to optimize braking performance by the antilock braking system (as opposed to drivers of cars, where it is recommended that the brakes be firmly and steadily applied). Thus, as the right brake pedal 108R and the left brake pedal 110L of the aircraft 100 equipped with an antilock braking system are already fully depressed during braking, the pilot is unable to depress further, for example, the left brake pedal 110L to cause a yaw to the left. Instead, to steer such an aircraft 100 to the left by differential braking, the pilot would have to resort to a counter intuitive response and reduce the force with which the right brake pedal 108R is depressed.

Such a course of action, in addition to being counter intuitive, is also highly nonlinear. Specifically, the braking pressure commanded by the pilot by fully depressing the brake pedals 108R and 110L is generally much higher than the braking pressure actually delivered to the wheels 104R, 106L respectively by the antilock braking system. Thus, to achieve a braking pressure that is less than this commanded braking pressure, the reduction in the force with which the right brake pedal 108R is depressed (for a yaw to the left) will have to be significant. In the interim, the pilot may experience a 'deadband', i.e., the pilot may, at least initially, notice no perceptible effect on the direction of travel of the aircraft 100 as he progressively reduces the force on the right brake pedal 108R. Moreover, the slip of the right wheel 104R may go too far below the desired 15%, thereby degrading stopping performance.

Figure 4:
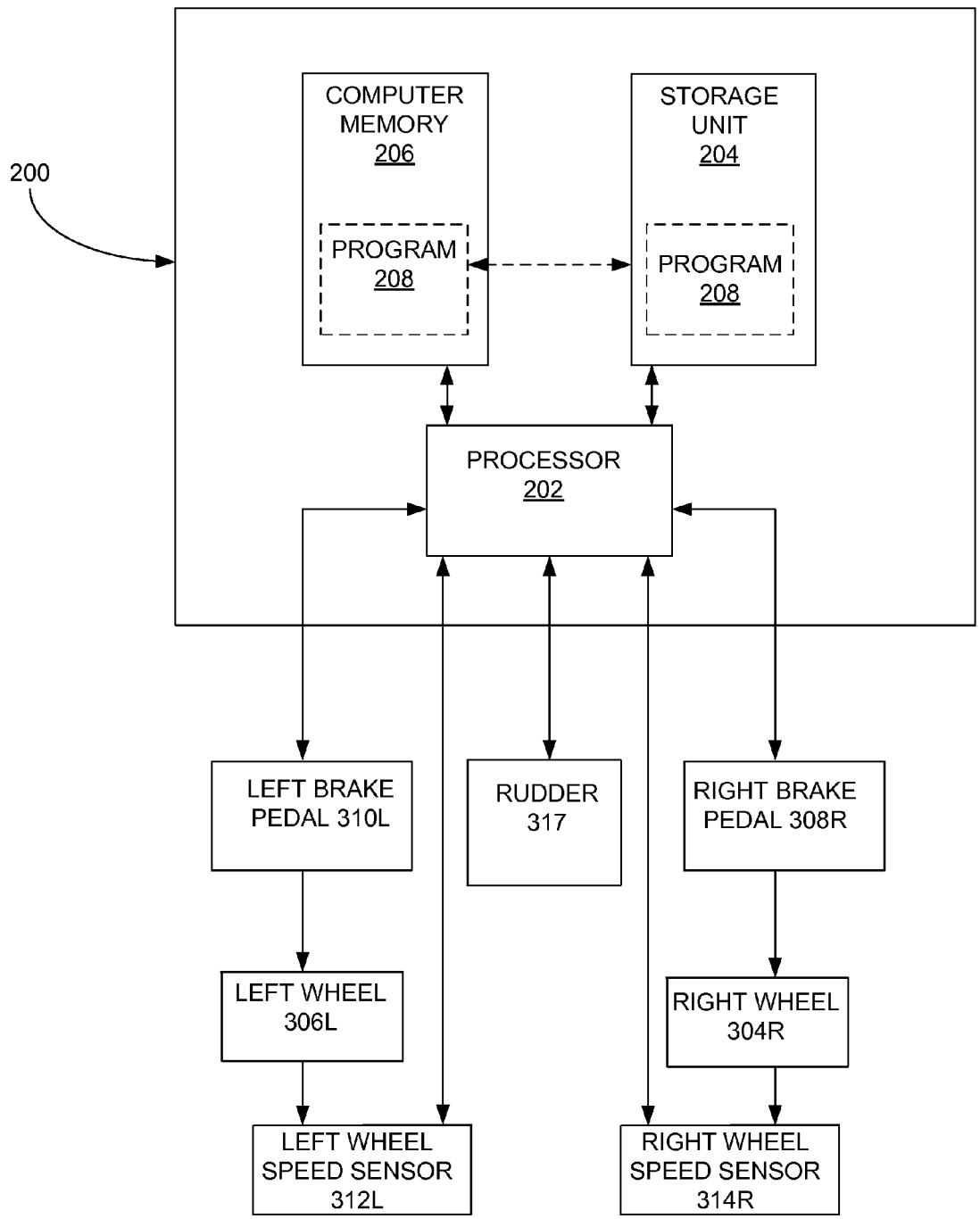
FIG. 4 is a block diagram showing some of the various components of an antilock braking system in accordance with the teachings of the current invention.

The present invention discloses an antilock braking system 200 that dispenses with the need to counter intuitively reduce the pressure on the right brake pedal 108R to cause the aircraft 100 to yaw to the left, or the left brake pedal 110L to cause the aircraft 100 to yaw to the right. As shown in FIG. 4, the antilock braking system 200 may include a processor 202, and a computer memory 206. The antilock braking system 200 may also include a separate storage unit 204, or the storage unit 204 may be incorporated within the computer memory 206. The storage unit 204 and the computer memory 206 are in data communication with the processor 202. The storage unit 204 may be, for example, a hard drive or disk drive that stores programs and data, and the storage unit 204 is illustratively shown storing a program 208 embodying the steps and methods set forth below. It should be understood that the program 208 could be broken into subprograms and stored in storage units of separate computers and that data could be transferred between those storage units using methods known in the art. A dashed outline within the computer memory 206 represents the software program 208 loaded into the computer memory 206 and a dashed line between the storage unit 204 and the computer memory 206 illustrates the transfer of the program 208 between the storage unit 204 and the computer memory 206.

As noted above, to maintain directional control during braking of an aircraft 100 having the free-castering nosewheel 102, pilots utilize both rudder control and differential braking. Position of the rudder 117, thus, serves as a reliable indicator of the pilot's desired steering response. The rudder 117 is typically located at the rear of the fuselage (see FIG. 1), and while not clearly shown in the figures, the position of the rudder 117 is generally controlled by a left rudder pedal 120L and a right rudder pedal 120R. Depressing the left rudder pedal 120L deflects the rudder 117 to the left (for causing the nose 103 of the aircraft 100 to yaw to the left), while depressing the right rudder pedal 120R deflects the rudder to the right (for causing the nose 103 of the aircraft 100 to yaw to the right). As is conventional, the aircraft 100 may also include gauges that convey the current position of the rudder 117. The antilock braking system 200 utilizes the position of the rudder 117 to estimate the pilot's desired steering response, and then automates differential braking to steer the aircraft 100 in accordance with this desired steering response.

Figure 5:
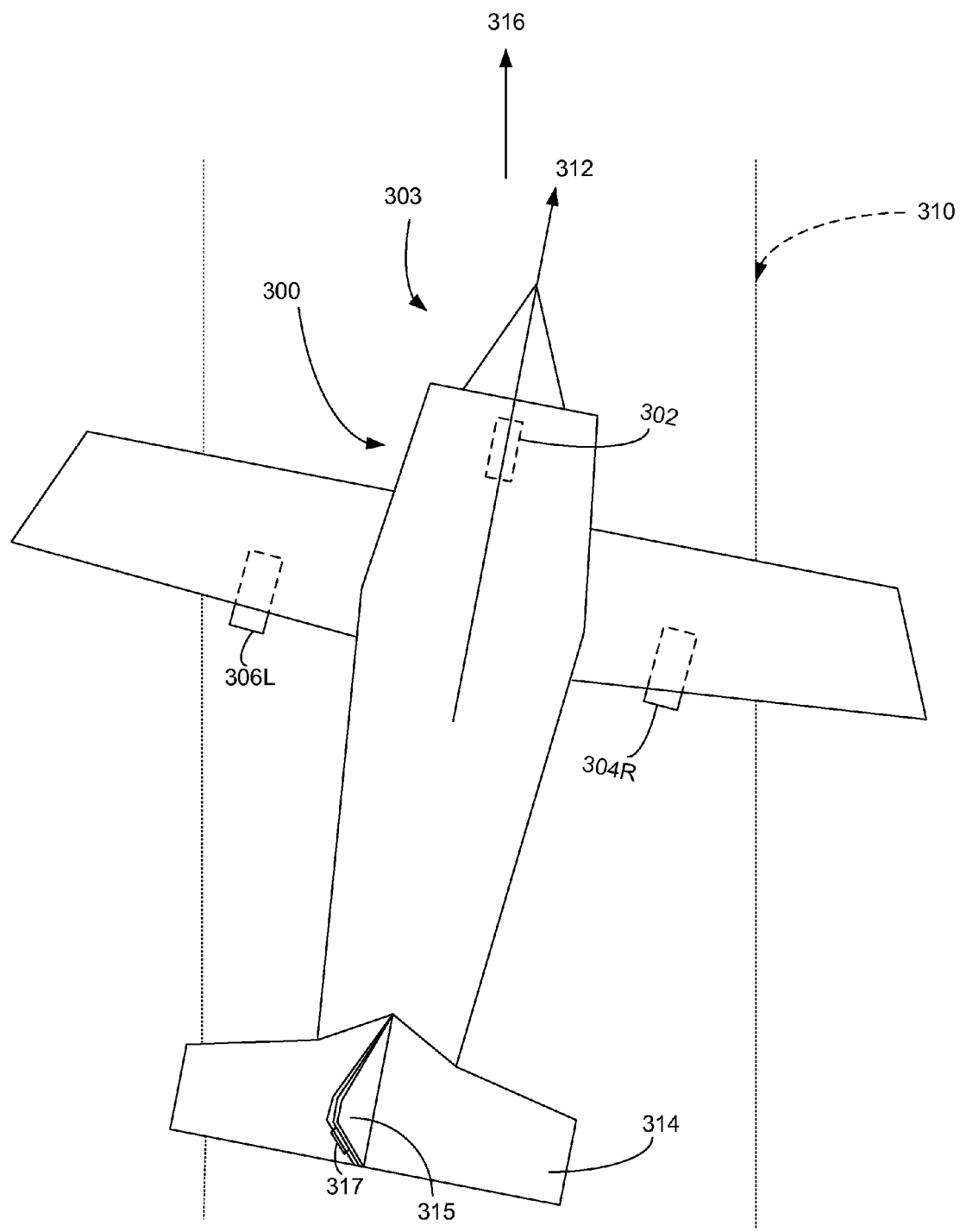
FIG. 5 shows a top view of an aircraft equipped with the antilock braking system of FIG. 4 taxiing on a runway in an unintended direction.

To illustrate, consider an aircraft 300 taxiing on a runway 310 as shown in FIG. 5. The aircraft 300 is equipped with the antilock braking system 200 disclosed herein. The aircraft 300 has a free-castering nosewheel 302, a right wheel 304R, and a left wheel 306L. A right brake 308B is linked to the right wheel 304R and is controlled by a right brake pedal 308R. Similarly, a left brake 310B is linked to the left wheel 306L and is controlled by a left brake pedal 310L. The aircraft 300 also has a tail 314, atop which a vertical fin 315 having a rudder 317 is disposed. The rudder 317 may be deflected to the left (to cause a nose 303 to yaw to the left) by a left rudder pedal 320L, and may be deflected to the right (to cause the nose 303 to yaw to the right) by a right rudder pedal 320R. As can be seen in FIG. 5, the aircraft 300 has an unintended right hand yaw, and the nose 303 of the aircraft needs to be steered to the left so that a direction of travel 312 of the aircraft 300 corresponds to an intended direction of travel 316 along the center of the runway 310.

As the aircraft 300 is off-course, and because it is equipped with an antilock braking system, the pilot may depress fully both the right brake pedal 308R and the left brake pedal 310L to optimize braking performance by the antilock braking system 200 (note that the antilock braking system 200 does not require that the brake pedals 308R, 310L be depressed fully, and may be triggered when the brake pedals 308R, 310L are depressed significantly.) Also, to steer the nose 303 of the aircraft 300 to the left, the pilot may depress the left rudder pedal 320L with a certain force, causing the rudder 317 to deflect to the left. The processor 202 may use the fact that both the right (308R) and left (310L) brake pedals are fully (or significantly) depressed, along with the off-center position of the rudder 317, to establish that the pilot desires for the nose 303 of the aircraft 300 to yaw to the left. The processor 202 may also utilize the extent to which the rudder 317 is off-center to determine the specifics of this intended yaw; for example, where the rudder 317 is at its left most position (i.e., where the left rudder pedal 320L is fully depressed), the processor 202 may determine that the pilot desires for the aircraft 300 to sharply yaw to the left; similarly, where the rudder 317 is only slightly off-center (i.e., where the left rudder pedal 320L is slightly depressed), the processor 202 may determine that the pilot desires for the aircraft 300 to slowly yaw to the left, and so on.

Once the processor 202 of the antilock braking system 200 determines the intended steering response (yaw towards the left in this example), the processor 202 may query right wheel speed sensor 314R (see FIG. 4), which is coupled to the right wheel 304R, to determine the speed of the right wheel 304R. The processor 202 may also determine the speed of the aircraft 100, which as noted, is conventionally estimated by using proprietary algorithms. The processor 202 may then calculate the slip of the right wheel 304R, and reduce this slip in proportion to the position of the rudder 317 (e.g., from 15% to 13% to allow for a slow left yaw, or from 15% to 5% to allow for a sudden left yaw). Differential braking, thus, is automatically effectuated, and the aircraft 300 may yaw to the left as desired. The antilock braking system 200 may similarly cause the aircraft 300 to yaw to the right by reducing the target slip of the left hand wheel 306L. The processor 202 may then reinstate the original slip target of the left (306L) or right (304R) wheels (e.g., to 15%) after the aircraft 300 has been steered as desired and the pilot releases the rudder pedals 320L and 320R.

Figure 6:
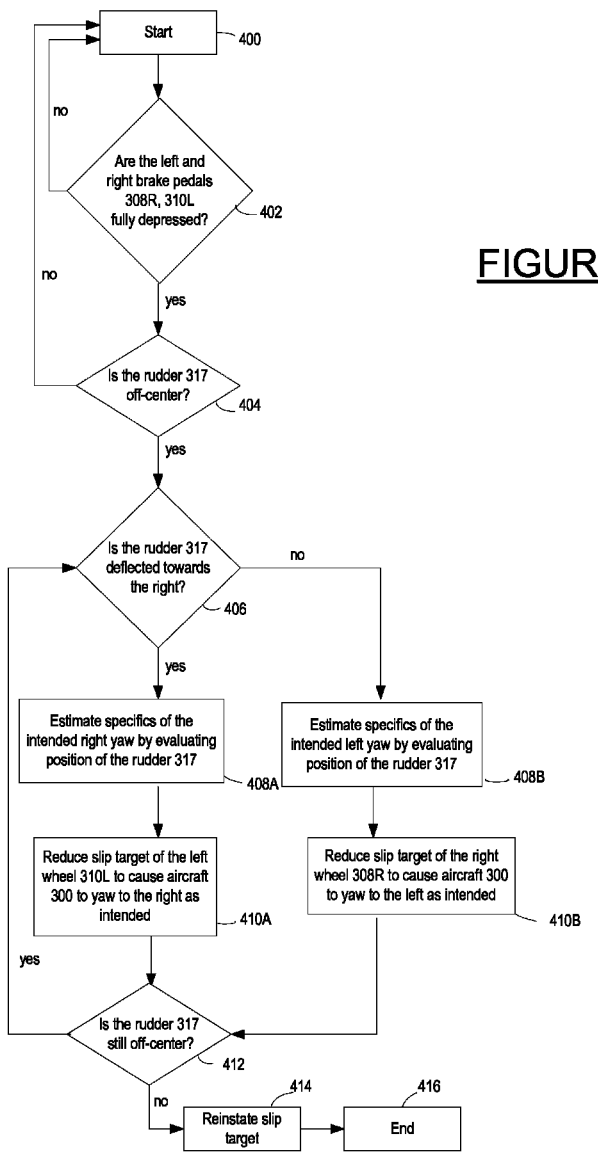
FIG. 6 is a flowchart outlining some of the steps taken by the antilock braking system of FIG. 4.

FIG. 6 shows a flowchart outlining the steps discussed above. Specifically, the process begins at step 400, and at step 402, the antilock braking system 200 (e.g., the processor 202) checks whether the right (308R) and left (310L) brake pedals of the aircraft 300 are fully depressed. If both the right (308R) and left (310L) brake pedals are fully depressed, then at step 404, the antilock braking system 200 checks whether the rudder 317 is off-center. If at step 406 the antilock braking system 200 determines that the rudder 317 is deflected to the right, it establishes that the pilot desires for the nose 303 of the aircraft 300 to yaw to the right, and estimates the specifics of this right yaw by evaluating the extent to which the rudder 317 is off-center at step 408A. Then, at step 410A, the antilock braking system 200 reduces the slip target of the left wheel 110L in proportion to the position of the rudder 317. The aircraft 300, consequently, yaws to the right. At step 412, the antilock braking system 200 checks whether the rudder 317 is still off-center, to determine whether the pilot wants the aircraft 300 to be steered further. If neither of the rudder pedals 220L, 220R are depressed, the antilock braking system 200 establishes that the aircraft 300 has been steered as intended, and reinstates the original slip target (e.g., 15%) of the left wheel 310L at step 414. The process then ends at step 416. If the rudder 317 is still off-center at step 412, however, the antilock braking system 200 establishes that the aircraft 300 has not steered as desired (for e.g., the intended right yaw has not completed, or the aircraft 300 has over-steered), and repeats step 406 through 416 until the rudder 317 is returned to the center by the pilot.

Similarly, if the antilock braking system 200 determines at step 406 that the rudder 317 is deflected towards the left, it establishes that the pilot desires for the aircraft 300 to yaw to the left, and evaluates the position of the rudder 317 to determine the specifics of this intended yaw at step 408B. It then, at step 410B, reduces the slip target of the right wheel 308R to cause the aircraft 300 to yaw to the left. If at step 412 the antilock braking system 200 determines that the rudder 317 is no longer off-center, it reinstates the original slip target of the right wheel 308R. In this way, the antilock braking system 200 automatically commands differential braking and dispenses with the need for the pilot to counter intuitively reduce the force on the right brake pedal 308R to cause the aircraft 300 to yaw to the left, or the left brake pedal 310R to cause the aircraft 300 to yaw to the right.

According to an alternate embodiment, instead of modifying the target slip of the right (308R) or left (310L) wheels to effectuate a yaw to the left or right respectively, the antilock braking system 200 may artificially modify the calculated ground speed that is used to compute the slip of the right (308R) or the left (310L) wheel in proportion to the position of the rudder 317. Specifically, once the processor 202 of the antilock braking system 200 determines the intended steering response (yaw towards the left, for example) via position of the rudder 317, it may artificially increase the calculated ground speed of the aircraft 300 before it is used to compute the slip of the right wheel 304R (the calculated ground speed of the aircraft 300 used to compute the slip of the left wheel 306L will not be artificially modified in this example). Artificially increasing the calculated ground speed of the aircraft 300 in computing the slip of the right wheel 304R will consequently cause the slip of the right wheel 304R to also artificially increase. The antilock braking system 200 may subsequently reduce this slip (e.g., from 20% to the target slip of 15%) by reducing the braking pressure on the right wheel 304R. The aircraft 300 will therefore yaw in the intended direction (towards the left in this example). The artificially increased ground speed of the aircraft 300 may be subsequently adjusted (i.e. reduced) to reflect the calculated ground speed once the aircraft 200 has been steered as desired and the pilot releases the rudder pedals 320L or 320R.

While the invention has been described with reference to an aircraft 300 having a free-castering nosewheel 302, the antilock braking system 200 may also be used in aircraft 500 having nosewheel steerings 502 to reduce pilot workload and to improve path control. Moreover, during antiskid braking of such aircraft 500, the antilock braking system 200 may provide a transparent backup to the nosewheel steering 502. A pilot may thus be able to maintain directional control of the aircraft 500 during braking even where the nosewheel steering 502 fails. Additional inputs, such as the lateral acceleration of the aircraft 502, may also be fed to the processor 202 to automatically negate any path deviations that have not been commanded.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for adjusting an unintended yaw of an aircraft having a free-castering nose wheel, a left wheel, a right wheel, an antilock braking system, a left brake pedal for operating a left wheel brake associated with the left wheel, a right brake pedal for operating a right wheel brake associated with the right wheel, a controller for executing a computer implemented routine, and a rudder, the method comprising steps:
   automatically triggering the routine when:
      one of a left rudder pedal and a right rudder pedal is depressed to cause the rudder to deflect off-center; and
      the left brake pedal and the right brake pedal are each fully depressed to cause the antilock braking system to respectively apply an optimal retarding force with each of the left wheel brake and the right wheel brake receiving by the controller a directional input from the rudder upon the triggering of the routine; and
   using the routine to deliver a braking output by the controller to automatically reduce an actual braking pressure of one of the left wheel brake and the right wheel brake in line with the directional input until the depressed rudder pedal is released and the unintended yaw is corrected, wherein the routine artificially increases a calculated ground speed of the aircraft used to compute a slip of one of a left and right wheel, causing the slip of one of the left and right wheels to also artificially increase.

2. The method of claim 1, wherein a right speed sensor is coupled to the right wheel, and a left speed sensor is coupled to the left wheel.

3. The method of claim 2, wherein an original slip target of at least one of the right wheel and the left wheel is reinstated after the aircraft has steered in accordance with the directional input.

4. The method of claim 1, wherein the optimal retarding force generally maintains a wheel slip ratio of about fifteen percent.

5. The method of claim 4, wherein the braking output is proportional to the directional input.

6. A method for correcting a yaw of an aircraft traveling on a runway, the method comprising:
   triggering a computer implemented routine by:
      fully depressing each of a left wheel brake pedal associated with a left hand wheel brake and a right wheel brake pedal associated with a right hand wheel brake; and
      deflecting a rudder off-center using a rudder pedal;
   receiving a directional input upon the triggering of the routine;
   imposing by a controller a pulsing cycle wherein an intermittent and automatic release of both of the left and right hand wheel brakes occurs; and
   using the routine to reduce a pressure on one of the left hand wheel brake and the right hand wheel brake according to the directional input, wherein the routine artificially increases a calculated ground speed of the aircraft used to compute a slip of one of a left and right wheel, causing the slip of one of the left and right wheels to also artificially increase, thereby inducing an antilock braking system to subsequently reduce the slip of one of the left and right wheels to a target slip by reducing the braking pressure on one of the left hand wheel brake and the right hand wheel brake.

7. The method of claim 6, wherein the aircraft has a free-castering nosewheel.

8. The method of claim 7, wherein the reduction in the pressure on one of the left hand wheel brake and the right hand wheel brake is proportional to the directional input.

9. A method for adjusting an unintended yaw of an aircraft having a nose wheel, a left wheel, a right wheel, an antilock braking system, a left brake pedal for operating a left wheel brake associated with the left wheel, a right brake pedal for operating a right wheel brake associated with the right wheel, a controller for executing a computer implemented routine, and a rudder, the method comprising steps:
   triggering the routine by:
      depressing one of a left rudder pedal and a right rudder pedal to cause the rudder to deflect off-center; and
      depressing fully the left brake pedal and the right brake pedal to cause the antilock braking system to respectively apply an optimal retarding force with each of the left wheel brake and the right wheel brake;

receiving by the controller a directional input from the rudder after the routine has been triggered; and using the routine to deliver a braking output by the controller to automatically reduce an actual braking pressure of one of the left wheel brake and the right wheel brake in line with the directional input until the depressed rudder pedal is released, wherein the routine artificially increases a calculated ground speed of the aircraft used to compute a slip of one of the left and right wheels, causing the slip of one of the left and right wheels to also artificially increase, thereby inducing the antilock braking system to subsequently reduce the slip of one of the left and right wheels to a target slip by reducing the braking pressure on one of the left hand wheel brake and the right hand wheel brake.

10. The method of claim 9 wherein the nose wheel is a free castering nosewheel.

11. The method of claim 10, wherein a right speed sensor is coupled to the right wheel, and a left speed sensor is coupled to the left wheel.

12. The method of claim 11, wherein an original slip target of at least one of the right wheel and the left wheel is reinstated after the aircraft has steered in accordance with the directional input.

13. The method of claim 9, wherein:

the aircraft has a nosewheel steering; and the routine serves as a backup to the nosewheel steering and is triggered when the nosewheel steering fails.

14. A method for adjusting the yaw of an aircraft, the aircraft having a no sewheel, a left wheel, a right wheel, a left wheel brake for applying a retarding force to the left wheel, a right wheel brake for applying a retarding force to the right wheel, a left brake pedal associated with the left wheel brake, a right brake pedal associated with the right wheel brake, a rudder and a rudder pedal associated therewith, and a braking system having a controller and non-transitory memory for implementing a routine, the method comprising steps:

triggering the routine when each of:

the left wheel brake is applying a retarding force to the left wheel and the right wheel brake is applying a retarding force to the right wheel; and the rudder is off center;

receiving a directional input upon the triggering of the routine;

imposing by a controller a pulsing cycle wherein an intermittent and automatic release of both of the left and right wheel brakes occurs; and using the routine to reduce a pressure on one of the left wheel brake and the right wheel brake according to the directional input;

wherein the routine artificially modifies a calculated ground speed of the aircraft used to compute a slip of one of the left wheel and the right wheel, causing the slip of one of the left and right wheels to also artificially increase, thereby inducing the controller to subsequently reduce the slip of one of the left and right wheels to a target slip by reducing the retarding force being applied by one of the left wheel brake and the right wheel brake.

* * * * *